United States Patent [19]
Fuller et al.

[11] 3,816,077
[45] June 11, 1974

[54] CHLORINE DIOXIDE GENERATING SYSTEM

[75] Inventors: Willard A. Fuller, Grand Island; Arthur C. Schulz, North Tonawanda; Herbert J. Rosen, Montrose, all of N.Y.

[73] Assignee: Hooker Chemical Corporation, Niagara Falls, N.Y.

[22] Filed: May 21, 1971

[21] Appl. No.: 145,669

[52] U.S. Cl............. 23/260, 23/260, 23/285, 23/283, 23/252 A, 23/282, 260/871, 423/478, 423/480, 261/76, 261/124
[51] Int. Cl. .................. B01j 7/02, C01b 11/02
[58] Field of Search ............. 23/260, 283, 285, 282, 23/152, 252; 260/871; 137/604, 375; 261/76, 124; 159/DIG. 25, 47 R; 239/602, DIG. 19; 210/62, 19 E; 423/478

[56] References Cited
UNITED STATES PATENTS

| | | | |
|---|---|---|---|
| 2,620,260 | 12/1952 | Ekman | 23/152 |
| 2,634,251 | 4/1953 | Kass | 260/871 |
| 3,347,628 | 10/1967 | Sepall et al. | 423/478 |
| 3,502,443 | 3/1970 | Westerlund | 23/282 |
| 3,516,790 | 6/1970 | Westerlund | 23/282 X |

FOREIGN PATENTS OR APPLICATIONS 1,056,790  1/1967  Great Britain ............ 423/478

Primary Examiner—James H. Tayman, Jr.
Attorney, Agent, or Firm—Peter F. Casella; Donald C. Studley; William J. Crossetta, Jr.

[57] ABSTRACT

A chlorine dioxide producing system comprising a generator-evaporator-crystallizer reaction tower, a condenser, a chlorine dioxide absorption tower, vacuum producing means, a chlorine absorption tower and a solid-liquid separator in communication with the reaction tower provides an extremely efficient chlorine dioxide generation system.

11 Claims, 4 Drawing Figures

CHLORINE DIOXIDE GENERATING SYSTEM

BACKGROUND OF THE INVENTION

Chlorine dioxide generating systems have heretofore comprised a multiplicity of generators operating in cascade flow (U.S. Pat. No. 2,664,341, Dec. 29, 1953, E. E. Kesting) or a combination of a poly-zoned apparatus or plural apparatuses in which various distinct chemical and/or physical operations have been separated into chlorine dioxide generation, water evaporation, by-product salt crystallization, and reactant introduction into the system (U.S. Pat. No. 3,516,790, Westerlund, June 23, 1970; U.S. Pat. No. 3,341,288, Partridge, Sept. 12, 1967).

BRIEF DESCRIPTION OF THE INVENTION

In accordance with this invention, there is provided a system for the preparation of chlorine dioxide, chlorine and an alkali metal salt including:

a. a generator-evaporator-crystallizer reactor vessel for chlorine dioxide production including inlet means for chlorate containing solution, inlet means for a strong mineral acid, outlet means for the removal of alkali metal salt solids in the form of a slurry, and reaction gas outlet means for withdrawl of chlorine dioxide, chlorine and water vapor;

b. a chlorine dioxide absorption tower in communication with said reaction gas outlet of said reactor vessel, said chlorine dioxide absorption tower being equipped with inlet means for water, outlet means for an aqueous solution of chlorine dioxide and outlet means for non-absorbed reaction gas;

c. a vacuum producing means;

d. a chlorine absorption tower in communication through said vacuum producing means with said outlet for non-absorbed reaction gas, equipped with an inlet for water and an outlet for an aqueous solution of chlorine; and e. a solid-liquid separator in communication with the outlet for alkali metal salt containing slurry of said reactor vessel equipped with a conduit for the return of filtrate to said reactor vessel and means for solid alkali metal salt removal.

GENERATOR

The reactor vessel performs three distinct functions simultaneously. These functions are: first, the generation of chlorine dioxide and chlorine; second, the evaporation of water from the reaction solution; and third, crystallization of an alkali metal salt corresponding to the cation of the alkali metal chlorate introduced into the reaction solution and the anion of the strong mineral acid employed in the reaction. The generation of chlorine dioxide and chlorine within the reaction vessel proceeds in accordance with the equation

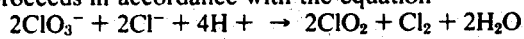

when the chloride ion is employed as the reducing agent for an alkali metal chlorate. The by-product alkali metal salt of the acid used, the chloride when HCl is employed as the strong mineral acid, the sulfate when sulfuric acid is employed as the strong mineral acid or the phosphate when phosphoric acid is employed as the strong mineral acid, crystallizes in the reaction solution during chlorine dioxide generation. Thus, the reaction vessel functions as a crystallizer as well as a chlorine dioxide generator. The crystallization of alkali metal salt during chlorine dioxide generation is made possible only through the operation of the reaction vessel under vacuum conditions. By evaporation of water in an amount sufficient to maintain a substantially constant volume of reaction solution, the alkali metal salt by-product increases in concentration until nucleation occurs and crystal growth proceeds to produce solid alkali metal salts of sufficient size to form a slurry. The water that must be evaporated from the reaction solution to maintain a substantially constant volume is that water which is introduced into the system with the reactants, water produced in the reaction of alkali metal chlorate with a reducing agent in the presence of an acid, water used to purge the system, and wash water employed to treat the alkali metal salt solids at the point of removal from the reaction solution.

The reaction vessel provides a large gas disengaging area at the surface of the reaction solution to assist in overcoming any problems of foaming resulting from the large volume of gaseous material leaving the reaction solution. In practice, the reaction vessel is in the form of a tower having a height to internal diameter ratio of about 1 to 5. A free board gas disengagment zone above the height of the reaction solution within the reaction vessel is provided which is slightly in excess of the diameter of the reaction vessel. Thus, a reaction vessel which is 7 feet in diameter is 35 feet high would have a free board gas disengagement region above the reaction solution of approximately 10 feet.

The reaction vessel, to provide very efficient evaporation of water from the reaction solution and to sweep the product gases, chlorine dioxide and chlorine, from the generator as a diluted gas mixture with the evaporated water vapor, must be able to withstand very high vacuum operating conditions. Thus, a reactor vessel is ideally operable under full vacuum conditions. By full vacuum conditions applicants mean, vacuum conditions in which there is a differential pressure from the inside to the outside of the vessel of one atmosphere (14.966 pounds per square inch absolute).

Ideally, the reaction vessel for the production of chlorine dioxide, operating as a generator-evaporator-crystallizer, is constructed of a polyester resin which is impervious toward the corrosive attack of the chloride ion and is not subject to oxidation by the action of chlorine dioxide nor subject to attack by the chlorine through addition or substitution, and is not subject to corrosive attack by the mineral acid employed in the reaction solution. Furthermore, the polyester resin must be able to withstand a temperature at which the reaction is conducted in the reactor vessel as well as provide sufficient strength to withstand the full vacuum operation.

Applicants have found that a reaction vessel which meets all of these requirements may be constructed from a polyester resin impregnated, wound glass filament exterior matrix approximately 1⅛ inches thick with an internal application of about ¼ inch thickness of chopped glass filament strands impregnated with the same polyester resin and an internal gel coat of that resin which is approximately 500 mils thick to provide an overall reactor body which is translucent and of sufficient strength to support the body of reaction solution needed to generate 10 tons of chlorine dioxide per day.

The polyester resin which is expecially suitable for use in this application is the polyester resin comprised of about 0.5 mole fraction of chlorendic acid and maleic anhydride and about 0.5 mole fraction neopentyl glycol, and about 45 parts of styrene per 100 parts of resin. The resin itself may be prepared in accordance with the procedures disclosed in U.S. Pat. No. 2,634,251, the subject matter of this patent being expressly incorporated herein by reference for the purpose of illustrating the techniques for the formulation of the resin from the components set forth, supra.

The reactor vessel constructed as indicated, presents a unilocular enclosure defining one space containing no internal zoning structure. The reactor vessel is provided with a reaction solution circulation half loop conduit which contains the inlets for alkali metal chlorate and reducing agent as well as the inlets for introduction of strong mineral acid and means for heating the reaction solution. Thus, the means for controlling the reaction conditions of temperature and reactant concentration as well as the means for by-product alkali metal salt removal are provided for in the reaction solution circulation half loop conduit. Thus, there is provided in the half loop conduit, an inlet for introducing an alkali metal chlorate such as Na $ClO_3$, a reducing agent such as Na Cl or $CH_3OH$, and a catalyst, if desired; inlet means for introduction of a strong mineral acid; and an outlet for removal of solid alkali metal salt slurry. The circulation half loop is constructed of titanium. The circulation half loop provides a pump to remove and drive the reaction solution for the reaction vessel through the half loop.

A section of the reaction solution circulation half loop conduit contains heat exchanger means, preferably a heating device such as a steam jacket capable of containing saturated steam for rapid heat conductance to the aqueous reaction solution. The heat required for operation of the reaction vessel is that heat which is necessary to evaporate the water introduced with the reactants and the water formed by the chlorine dioxide generating reaction. This amount of heat must be introduced into the reaction solution by the external heat exchanger. In operation, a large side stream is withdrawn from the bottom of the reactor vessel and is circulated through a steam heated exchanger and is returned to the generator at the operating level of the reaction solution. The flow of reaction solution is large to prevent the heat exchanger tubes from fouling with alkali metal salt crystals. The large volume of circulating liquids also assists in providing good crystallization of alkali metal salt in that super-saturation is minimized, spontaneous nucleation is minimized, and the reaction solution magma is continuously agitated. In actual practice, the circulation of reaction solution through the reaction solution circulation half loop conduit is of such magnitude that the entire contents of the reaction vessel passes through the side arm in approximately 2 minutes.

The alkali metal chlorate and reducing agent solution is introduced into the half loop conduit ahead of the circulating pump so that it is thoroughly mixed by the pump. The water content of the incoming aqueous solution of alkali metal chlorate and reducing agent assists in diluting a reaction solution being withdrawn from the reactor vessel and preventing the crystallization of alkali metal salt in the heat exchanger tube walls. The mineral acid is added at a point in the half loop conduit above the heat exchanger (down stream from the heat exchanger). The mineral acid inlet means in the reaction solution circulation half loop conduit comprises plural TEFLON (polyperfluoroethylene) insert jets disposed longitudinally to the flow of reaction solution to prevent localized high acidity thereby maintaining high chlorine dioxide yields and efficiencies. The addition of mineral acid by the use of plural injection tubes causes an acceleration of the reaction in the half loop conduit forcing the solution back into the reaction vessel and causing a rapid release of chlorine dioxide gas as well as water vapor as the reaction solution enters the reaction vessel at the operating liquid level. The force of the circulating reaction solution causes injected reaction solution to pass across the reaction vessel, striking the opposite wall, and falling back into the reaction solution in a standing wave form.

The mineral acid injection means in the reaction solution circulation half loop conduit comprises plural Teflon (polyperfluoroethylene) insert jets disposed longitudinally to the flow of reaction solution. The acid injectors comprise 1½ inch bars of TEFLON 1.¼ inches long in which a ¼ inch hole has been drilled. These are individually fed. The jets extend into the reaction solution circulation half loop approximately 1½ inch so that the acid is flushed from the jet as it is forced into the circulating reaction solution to provide rapid dilution and mixing within the reaction solution magma.

The operating parameters for the chlorine dioxide generating system of the instant invention are those parameters known to the art. For example, the procedures set forth in U.S. Pat. No. 3,563,702, Feb. 16, 1971 — Partridge et al., are representative of techniques for reaction control which are ideally suited for performance within the system of the instant invention, and for that purpose, the disclosure of U.S. Pat. No. 3,563,702 is expressly included by reference herein.

The chlorine dioxide, chlorine and water vapor exiting the reactor vessel pass through a conduit to a condenser. The condenser may be a direct contact water cooler in which a spray of water of approximately 100° F. or below is employed to quench the entering mixed gases for the purpose of condensing the water vapor, and very rapidly cooling the chlorine dioxide to maintain it below its decomposition temperature. An effluent stream from the direct contact water cooler passes into a steam stripping device in which steam is fed directly into contact with the aqueous solution leaving the direct contact cooler to strip from that condensed water vapor any small amount of chlorine dioxide or chlorine which has been entrained in the condensed water vapor. The steam stripper gaseous material is fed back into the direct contact cooler.

Alternatively the chlorine dioxide, chlorine and steam leaving the generator may be conducted to an indirect contact condenser consisting of a shell and tube heat exchanger where the steam is condensed and the condensed water cooled. The chlorine dioxide, chlorine and condensate are then fed together into the chlorine dioxide absorption tower.

From the condenser, the gaseous mixture of chlorine dioxide and chlorine is fed to a chlorine dioxide absorption tower which may be any conventional type of vacuum packed absorption tower. Cooled water of approximately 40°–50° Fahrenheit or below is introduced into the chlorine dioxide absorption tower near its top while the mixture of chlorine dioxide and chlorine is introduced into the tower near the bottom. An off-stream effluent is removed from the bottom which is customarily a 6–10 gram per liter chlorine dioxide for use in a bleaching operation. The chlorine dioxide absorption tower contains an outlet at its top through which chlorine exits passing by a conduit through vacuum producing means into the bottom of a chlorine absorption tower.

The vacuum producing means may be any conventional device such as a mechanical vacuum pump, a water eductor or a steam syphon. The vacuum producing device follows the chlorine dioxide absorber in the system so that the partial pressure of the chlorine dioxide is maintained constant from the point of its generation through its absorption. Any substantial increase in the pressure of chlorine dioxide would lead to its spontaneous decomposition.

Chlorine gas is absorbed in water which is fed to the top of the chlorine absorption tower. The chlorine absorption tower is any conventional tower used for that purpose which may be packed in a manner known to the art. Chlorine water containing from 1 to 2 grams per liter chlorine is produced for utilization in lieu of fresh water in the chlorinator of a pulp bleach mill. If desired, a caustic solution can be fed into the chlorine absorption tower to produce a hypochlorite solution as opposed to a chlorine water solution.

A portion of the reaction solution magma which is circulated through the reaction solution circulation half loop conduit is withdrawn and passed to a filter where the by-product of alkali metal salt is separated from the filtrate. The filtrate and the wash liquors are returned to the chlorine dioxide reaction vessel. In some instances, where very fine alkali metal salt crystals are formed, it is desirable to insert a cyclone separator between the point of withdrawal of a portion of the reaction solution and the actual filter. The cyclone serves to thicken the slurry and to separate out fines which may be returned to the reaction vessel solution. If desired, the returning stream containing fine crystalline material may be heated or diluted to destroy excess nuclei. This treatment gives better control of crystal size and growth within the reaction vessel.

At the point of withdrawl of reaction solution from their reaction vessel for passage through the reaction solution circulation half-loop conduit, the abrasive force of the crystalline material in suspension in the reaction solution may be sufficiently great to erode the polyester resin-fiberglass filled reaction vessel wall, to a degree of sufficient severity that leaks may occur. For this reason, it is advantageous to line the outlet for the reaction solution half loop with a titanium sleeve which extends into the interior of the reaction vessel and forms an apron contiguous with the internal polyester resin gel coat. Thus, the abrasive force of the very rapidly circulating crystalline alkali metal salt material is dissipated.

DETAILED DESCRIPTION OF THE INVENTION

Figure 1:
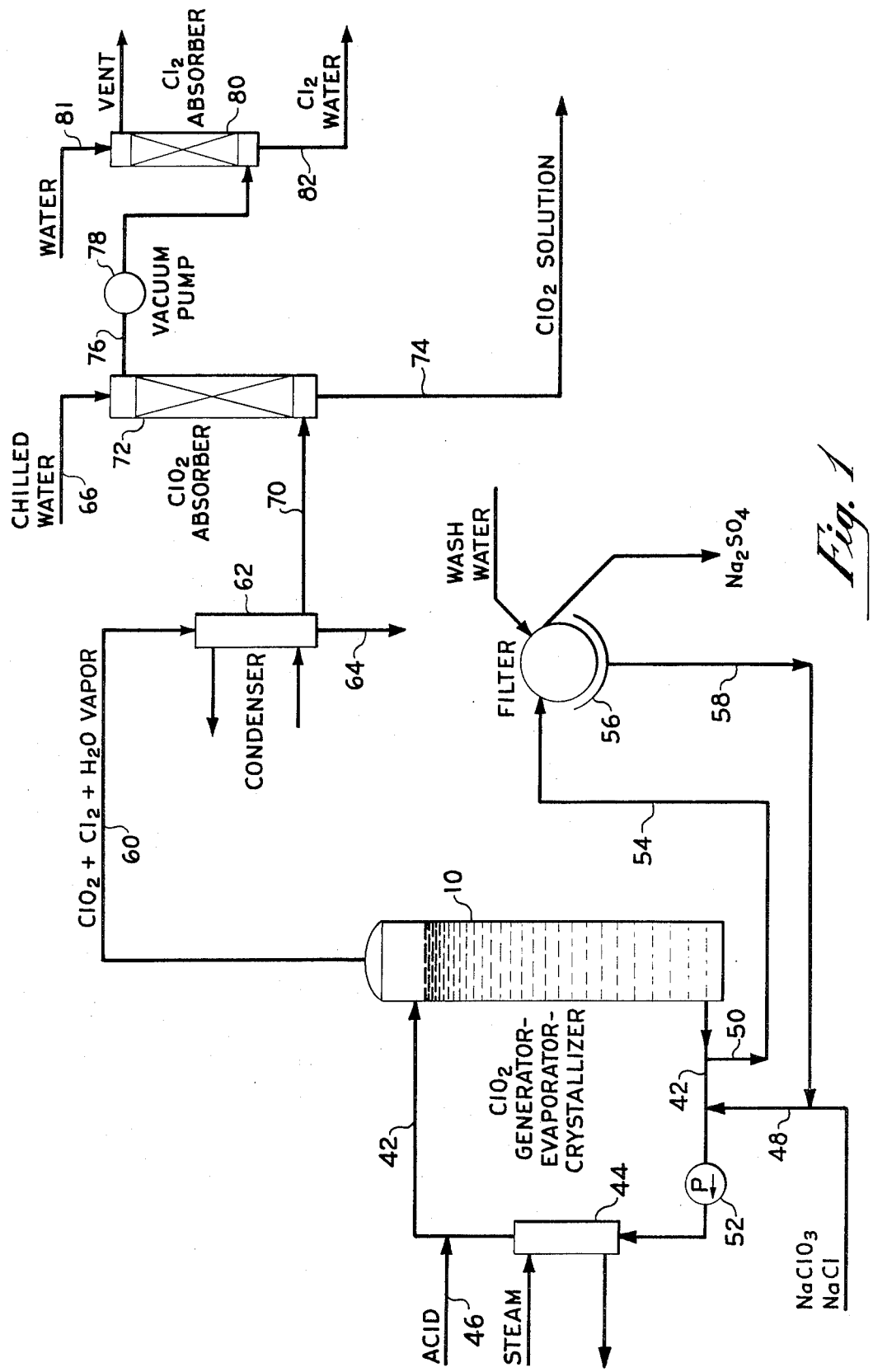
Figures 2, 3:
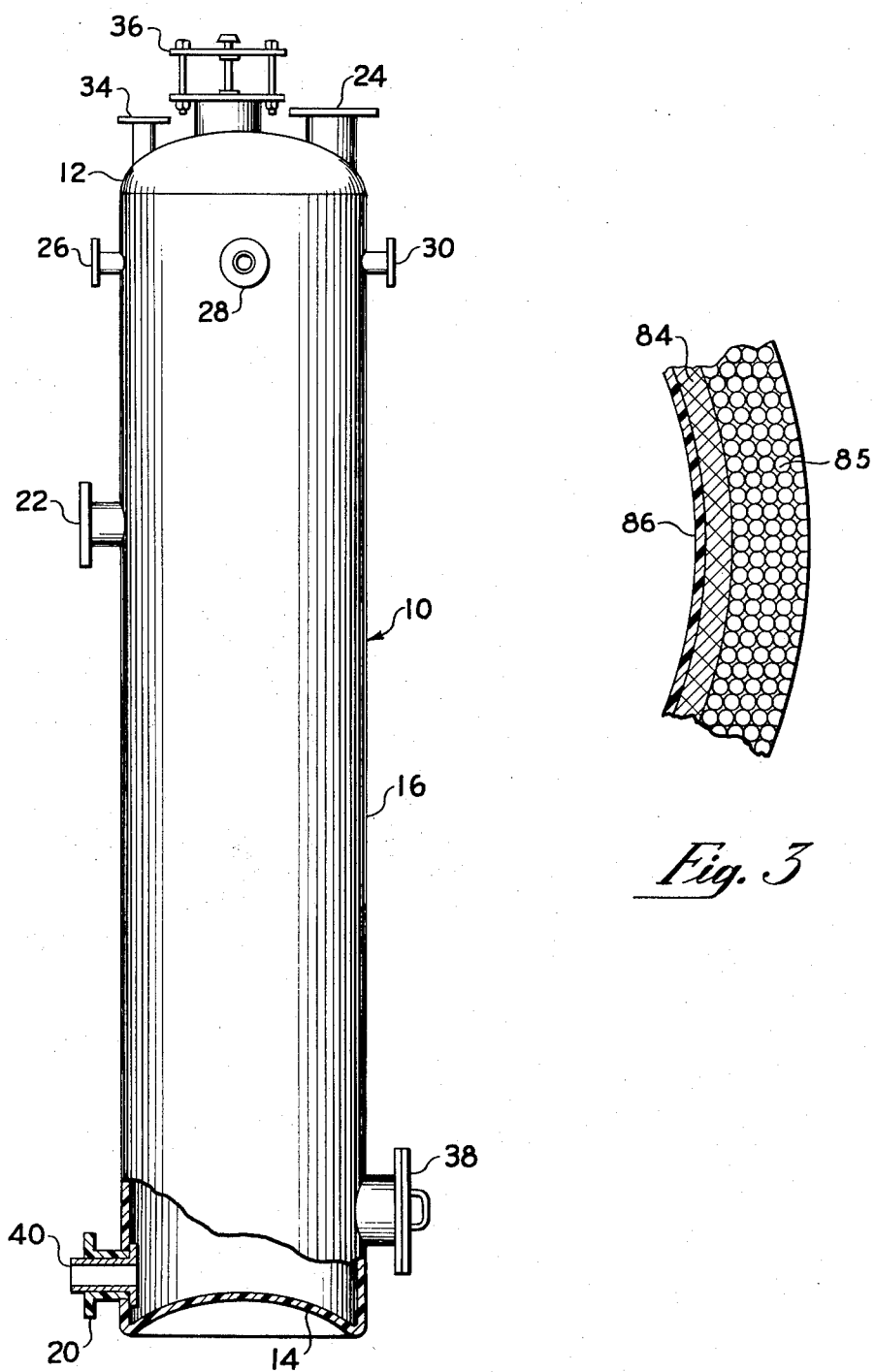

The chlorine dioxide producing system of this invention may be best understood by referring to the drawings in which FIG. 1 presents a flow diagram of the complete system of this invention;

FIG. 2 presents a sectional view of the chlorine dioxide generator-crystallizer-evaporator;

FIG. 3 presents a cross section of the generator side wall; and

Figure 4:
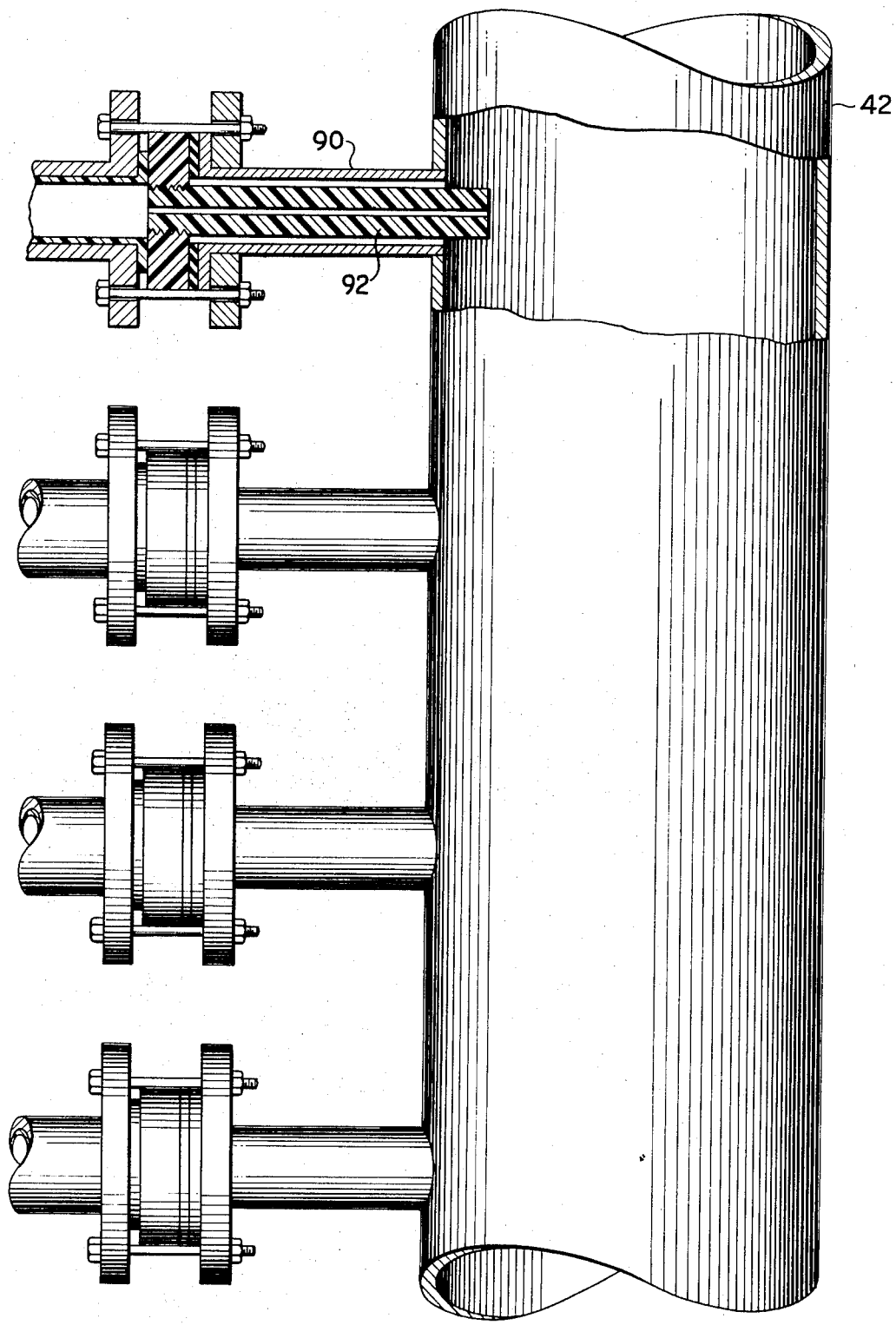

FIG. 4 presents a sectional view of the acid injection system.

Referring to FIG. 1, 10 designates the chlorine dioxide reactor in general, which is shown in greater detail in FIG. 2 to be a vertical reaction tower having a convex top 12, a concave bottom 14 and a sidewall 16. The chlorine dioxide reactor functions as a generator-evaporator-crystallizer and is a unilocular enclosure defining one space containing no internal zoning structure. The sidewall 16 is formed of polyester resin supported by a wound glass filament exterior section with a chopped fiber glass section and an inner gel coat of pure resin. Near the bottom of the sidewall 16 is an outlet 20 for removal of crystal containing reaction solution from generator 10. Near the top of sidewall 16 is an inlet 22 for the introduction of reactants, water and returned reaction solution. Just below the top of generator 10, situated about its circumference are four inlets 26, 28, 30 and one opposite 28, for the introduction of steam, air or water as needed to stop or reduce foaming, to dilute the chlorine dioxide or to dilute (quench) the reaction solution with water. The convex top 12 contains an outlet 24 for removal of gaseous material from generator 10 such as chlorine dioxide, chlorine and water vapor. The top 12 also contains a sight glass 34 and a pressure safety valve 36. Manhole 38 is provided near the bottom of reactor 10. A titanium sleeve 40 is provided in outlet 20 and is provided with an apron to protect the internal gel coat of reactor 10 from the abrasive action of the alkali metal sulfate crystal during its removal from the reactor.

Connected to the outlet 20 and inlet 22 of generator 10 is a half loop reaction solution circulation conduit 42 which is equipped with heat exchanger 44, acid inlet means 46, chlorate reactant inlet 48 which may also serve as the introduction site for a reducing agent such as an alkali metal chloride, outlet 50 for alkali metal salt crystal removal and pump 52.

Reaction solution is continuously pumped through half loop 42 in which the conditions of reactant concentration and reaction solution temperature are controlled and the solid product is removed. The solid crystalline alkali metal sulfate slurry removed at outlet 50 is passed via conduit 54 to solids-liquid separator 56 which may be any known device but is herein illustrated as a rotary filter. A cyclone separator (not shown) may be advantageously inserted in conduit 54 between filter 56 and outlet 50 to classify and thicken the solid alkali metal sulfate slurry before it is introduced into the filter. Thus, an amount of fines may be separated prior to filtration and, in combination with the filtrate and wash water from filter 56, returned via line 58 to inlet 48 of loop 42. In any event, the wash water and filtrate from filter 56 is returned via conduit 58 and half loop 42 to the main body of reaction solution in reactor 10. The product, neutral alkali metal sulfate ($Na_2SO_4$) is removed from filter 56.

Chlorine dioxide, chlorine and water vapor exit reactor 10 through outlet 24 at the top of reactor 10 and are conducted via line 60 to condenser 62 where the water vapor is condensed and the chlorine dioxide rapidly cooled to a temperature below its decomposition temperature. Condensate is removed from condenser 62 via line 64. Gaseous chlorine dioxide and chlorine leave condenser 62 via line 70 and are conducted to the lower region of absorber 72. The ClO₂ is absorbed in water, fed to the top of absorber 72 via line 66 and is removed from the bottom of the absorber via line 74 for use. The remaining gaseous material exits absorber 72 via line 76 in which is disposed vacuum producing means 78 which provides vacuum from the reactor 10 through the chlorine dioxide absorber 72. Line 76 conducts the chlorine containing gas to the lower region of absorber 80 in the top of which water is fed via line 81 to provide an aqueous chlorine solution removed at the bottom of 80 via line 82 for use. If desired, absorber 80 may be employed to produce hypochlorite by introducing an alkali metal hydroxide solution rather than water.

FIG. 3 presents an enlarged cross-sectional view of sidewall 16 in reactor 10. Wound glass filament 85 is covered by polyester resin to form an exterior matrix of reactor 10 which is about 1⅛ inches thick. A section of resin with interspersed chopped glass filament strands 84 (shard) inside the wound matrix 85 is about one-fourth inch thick and an internal gel coat 86 of resin approximately 500 mils thick provides a translucent reactor body.

FIG. 4 presents a sectional view of the acid injection means whereby four injectors 90 are disposed longitudinally in the reaction solution circulation conduit half loop 42 to provide sufficient dispersion of acid in the circulating reaction solution to present a hot spot explosion or surge of liquid from gas generation. The acid injectors comprise individually fed and valved, 10¼ inch long bars 92 of TEFLON (polyperfluoroethylene) having bored ¼ inch diameter hole. The jets extend approximately 1½ inches into the circulating reaction solution and are secured via sealed gasketing to the titanium wall of half loop 42 in the region downstream from heat exchange 44.

What is claimed is:

1. A generator-evaporator-crystallizer reaction tower for the production of chlorine dioxide, wherein a strong mineral acid is selected from the group consisting of hydrochloric acid, sulfuric acid, phosphoric acid and mixtures thereof being a unilocular enclosure, having a sidewall, a convex top and a concave bottom, said sidewall presenting in cross-section from the interior to the exterior, an internal gel coat of a polyester resin approximately 500 mils in thickness, a chopped fiberglass filled polyester resin section approximately one-fourth inch in thickness, and an external section of polyester resin impregnated wound glass filament section approximately 1⅛ inches in thickness, said polyester resin being the reaction product of about 0.5 mole fraction of chlorendic acid and maleic anhydride, and about 0.5 mole fraction neopentyl glycol in about 45 parts of styrene per 100 parts of resin, said sidewall being provided with inlet means for the introduction of reactants and water, outlet means for the removal of gaseous reaction products and water vapor and separate outlet means, having a contiguous titanium surface for the removal of crystalline alkali metal salts in the form of an aqueous slurry, in which said inlet for reactants and water and said outlet for the removal of alkali metal salt in the form of a slurry constitute a reaction solution circulation half loop conduit containing an outlet means for the removal of a fraction of a circulating reaction solution for the purpose of removing solid alkali metal salt by-product, inlet means for the introduction of alkali metal chlorate, in the form of an aqueous solution, and plural injection means for the introduction of a strong mineral acid into the circulating reaction solution.

2. The reaction tower of claim 1 in which said outlet for the removal of crystalline alkali metal salt comprises an aproned titanium sleeve extending into said outlet aperture to form an apron contiguous with said internal gel coat of polyester resin.

3. The reaction tower of claim 1 in which the ratio of the internal diameter of the reactor to the overall height of the reaction tower is about 1:4–6.

4. The reaction tower of claim 1 in which said reaction solution circulation half loop conduit contains a circulating pump, outlet means for the removal of a fraction of a circulating reaction solution for the purpose of removing solid alkali metal salt by-product, inlet means for the introduction of alkali metal chlorate and in the form of an aqueous solution, a circulating pump, heat exchange means, and plural injection jets for the introduction of a strong mineral acid into the circulating reaction solution.

5. A system for the preparation of chlorine dioxide, chlorine, and an alkali metal salt including:
   a. a generator-evaporator-crystallizer reaction tower being a unilocular enclosure consisting of a sidewall, a convex top and a concave bottom, said sidewall being provided with inlet means for the introduction of reactants and water, outlet means for the removal of gaseous reaction products and water vapor, separate outlet means, having a contiguous titanium surface for the removal of crystalline alkali metal salt in the form of and aqueous slurry, in which said inlet for reactants and water and said outlet for the removal of alkali metal salt in the form of a slurry constitute a reaction solution circulation half loop conduit containing an outlet means for the removal of a fraction of a circulating reaction solution for the purpose of removing solid alkali metal salt by-product, inlet means for the introduction of alkali metal chlorate, in the form of an aqueous solution, and plural injection means for the introduction of a strong mineral acid into the circulating reaction solution;
   b. a chlorine dioxide absorption tower including reaction gas inlet means in communication with said generator via said reaction gas outlet means, water inlet means, outlet means for and aqueous solution of ClO₂ and outlet means for the non-absorbed reaction gas;
   c. a chlorine absorption tower including reaction gas inlet means in communication with said non-absorbed reaction gas outlet means of said chlorine dioxide absorption tower, water inlet means, and outlet means for an aqueous solution of chlorine;
   d. vacuum producing means; and
   e. a solid-liquid separator for said slurry of alkali metal salt in communication with said outlet means for alkali metal salt in said generator and conduit from said solids separator to said chlorine dioxide generator to return liquid from said solids separator to said generator.

6. The system of claim 5 in which said chlorine dioxide absorption tower communicates with said generator via a direct contact cooler tower in which the heat values accompanying said chlorine dioxide, chlorine and water vapor from said generator are rapidly dissipated by direct contact with water spray at a temperature from an ambient temperature to about 80°F., said direct contact cooler toward being equipped with a spray nozzle and an outlet for non-absorbed gas.

7. The system of claim 6 in which said generator-evaporator-crystallizer reactor vessel, said direct contact cooler tower, and said chlorine dioxide absorption tower are in serial communication with a steam jet eductor operating to draw a vacuum in the up line apparatus of such magnitude that the gaseous mixture generated in said reactor vessel is swept through said serial apparatus system.

8. The system of claim 5 in which said solid-liquid separator includes a cyclone separator to classify solid alkali metal salt prior to separation from reaction solution by filtration.

9. The system of claim 5 in which said chlorine dioxide absorption tower communicates with said generator via an indirect contact heat exchanger.

10. The system of claim 5 in which said vacuum-producing means is a mechanical vacuum pump.

11. A generator-evaporator-crystallizer reaction tower for the production of chlorine dioxide being a unilocular enclosure having a sidewall, a convex top and a concave bottom, said sidewall presenting in cross-section from the interior to the exterior, an internal gel coat of a polyester resin approximately 500 mils in thickness, a chopped fiberglass filled polyester resin section approximately one-fourth inch in thickness, and an external section of polyester resin impregnated wound glass filament section approximately 1⅛ inches in thickness, said polyester resin being the reaction product of about 0.5 mole fraction of chlorendic acid and maleic anhydride, and about 0.5 mole fraction neopentyl glycol in about 45 parts of styrene per 100 parts of resin, said sidewall being provided with inlet means for the introduction of reactants and water and an outlet means for the removal of crystalline alkali metal salts in the form of a slurry constituting a reaction solution circulation half loop conduit with said inlet means, said conduit containing a circulating pump, outlet means for the removal of a fraction of a circulating reaction solution for the purpose of removing solid alkali metal salt by-product, inlet means for the introduction of alkali metal chlorate in the form of an aqueous solution, heat exchange means, and plural perfluoropolyethylene injection jets longitudinally disposed in said reaction solution circulation half loop conduit longitudinally with respect to the direction of flow of reaction solution, in such manner that the circulating reaction solution rapidly dilutes and mixes with the introduction of a strong mineral acid and outlet means for the removal of gaseous reaction products and water vapor.

* * * * *

PO-1050
(5/69)

UNITED STATES PATENT OFFICE
CERTIFICATE OF CORRECTION

Patent No. 3,816,077          Dated June 11, 1974

Inventor(s) Willard A. Fuller, Arthur C. Schulz and Herbert J. Rosen

It is certified that error appears in the above-identified patent and that said Letters Patent are hereby corrected as shown below:

Column 4, line 22, "1.1/4" should read -- 10 1/4 --. Column 5, line 45, "withdrawl" change to -- withdrawal --. Column 8, line 31, Claim 5, "and aqueous" change to -- an aqueous --; line 46, "and aqueous" change to -- an aqueous --. Column 9, line 2, Claim 6, "toward" should read -- tower --.

Signed and sealed this 29th day of October 1974.

(SEAL)
Attest:

McCOY M. GIBSON JR.          C. MARSHALL DANN
Attesting Officer          Commissioner of Patents